(12) United States Patent
Kim et al.

(10) Patent No.: US 8,564,730 B2
(45) Date of Patent: Oct. 22, 2013

(54) DISPLAY DEVICE

(75) Inventors: Han Young Kim, Seoul (KR); Hyun Ho Choi, Seoul (KR); Dae Kyu Yi, Gyeonggi-do (KR)

(73) Assignee: LG Display Co., Ltd., Seoul (KR)

(*) Notice: Subject to any disclaimer, the term of this patent is extended or adjusted under 35 U.S.C. 154(b) by 374 days.

(21) Appl. No.: 12/666,970

(22) PCT Filed: Jul. 1, 2008

(86) PCT No.: PCT/KR2008/003876
§ 371 (c)(1),
(2), (4) Date: Dec. 28, 2009

(87) PCT Pub. No.: WO2009/008617
PCT Pub. Date: Jan. 15, 2009

(65) Prior Publication Data
US 2010/0328570 A1    Dec. 30, 2010

(30) Foreign Application Priority Data

Jul. 6, 2007  (KR) .................. 10-2007-0067808
Jul. 6, 2007  (KR) .................. 10-2007-0067995
Jul. 13, 2007 (KR) .................. 10-2007-0070432

(51) Int. Cl.
*G02F 1/13357*   (2006.01)
(52) U.S. Cl.
USPC ........................................................ 349/58
(58) Field of Classification Search
None
See application file for complete search history.

(56) References Cited

U.S. PATENT DOCUMENTS

| | | | |
|---|---|---|---|
| 5,870,160 A | 2/1999 | Yanagawa et al. | |
| 5,988,827 A * | 11/1999 | Lee | 362/633 |
| 6,392,724 B2 * | 5/2002 | An et al. | 349/58 |
| 2004/0160546 A1 * | 8/2004 | Huang et al. | 349/58 |
| 2005/0243244 A1 * | 11/2005 | Huo | 349/68 |
| 2007/0103915 A1 * | 5/2007 | Chang | 362/374 |
| 2008/0106671 A1 * | 5/2008 | Kim | 349/61 |
| 2008/0129918 A1 * | 6/2008 | Kim et al. | 349/58 |
| 2008/0303971 A1 * | 12/2008 | Lee et al. | 349/58 |
| 2009/0027584 A1 * | 1/2009 | Han et al. | 349/58 |

FOREIGN PATENT DOCUMENTS

| | | |
|---|---|---|
| JP | 2004-196201 A | 7/2004 |
| JP | 2007-121339 A | 5/2007 |
| KR | 10-1999-0079752 A | 11/1999 |
| KR | 10-2000-0009876 A | 2/2000 |
| KR | 10-2002-0029709 A | 4/2002 |
| KR | 10-2003-0008790 A | 1/2003 |
| KR | 10-2004-0074928 A | 8/2004 |
| KR | 10-2005-0051246 A | 6/2005 |
| KR | 10-2007-0020238 A | 2/2007 |
| KR | 10-2007-0068119 A | 6/2007 |
| WO | WO-2006-049040 A1 | 5/2006 |

* cited by examiner

*Primary Examiner* — Thanh-Nhan P Nguyen
(74) *Attorney, Agent, or Firm* — Birch, Stewart, Kolasch & Birch, LLP (57) ABSTRACT

Provided is a display device. The display device comprises a receiving unit, a liquid crystal panel, and a backlight assembly. The receiving unit comprises a sidewall, a first support bent or curved to extend from the sidewall, a second support bent or curved to extend from the first support. The second support faces the sidewall. At least one of the liquid crystal panel and the backlight assembly is received in the receiving unit. The liquid crystal panel and the backlight assembly can be doubly protected by the sidewall and the second support, and a display device with improved mechanical strength can be realized.

19 Claims, 8 Drawing Sheets

DISPLAY DEVICE

CROSS-REFERENCE TO RELATED APPLICATIONS

This application is the U.S. national stage application of International Patent Application No. PCT/KR2008/003876, filed Jul. 1, 2008, which claims priority to Korean Application Nos. 10-2007-0067808, filed Jul. 6, 2007, 10-2007-0067995, filed Jul. 6, 2007 and 10-2007-0070432, filed Jul 13, 2007, the disclosures of each of which are incorporated herein by reference in their entirety.

TECHNICAL FIELD

The present disclosure relates to a display device.

BACKGROUND ART

A liquid crystal display (LCD) device, which is one of display devices, displays an image using the electrical and optical characteristics of liquid crystals. Since the LCD device is a light-receiving device that cannot emit light spontaneously, it requires a backlight assembly.

The backlight assembly can include a reflector, a light guide plate, a prism sheet, a diffusion sheet, a protection sheet, and a light source.

A liquid crystal (LC) panel and the backlight unit can be received in a receiving unit such as a chassis and a mold frame.

To manufacture a slimmer LCD device, the receiving unit should be slimmer even more and thus the strength of the receiving unit needs to improve.

DISCLOSURE OF INVENTION

Technical Solution

In the embodiment, a display device comprises: a receiving unit comprising a sidewall, a first support bent or curved to extend from the sidewall, and a second support bent or curved to extend from the first support, and facing the sidewall; at least one of a liquid crystal panel and a backlight assembly being received in the receiving unit.

In the embodiment, a display device comprises: a liquid crystal panel; a backlight assembly under the liquid crystal panel; a sidewall on an outer side of the liquid crystal panel and the backlight assembly; a first support extending from an inner surface of the sidewall; and a second support bent or curved to extend from the first support, and supporting at least one of the liquid crystal panel and the backlight assembly.

In the embodiment, a display device comprises: a receiving unit comprising a sidewall and a support extending from an inner surface of the sidewall, groove patterns being formed in at least one of the sidewall and the support; at least one of a liquid crystal panel and a backlight assembly being received in the receiving unit.

The details of one or more embodiments are set forth in the accompanying drawings and the description below. Other features will be apparent from the description and drawings, and from the claims.

MODE FOR THE INVENTION

Reference will now be made in detail to the embodiments of the present disclosure, examples of which are illustrated in the accompanying drawings.

Figure 1:
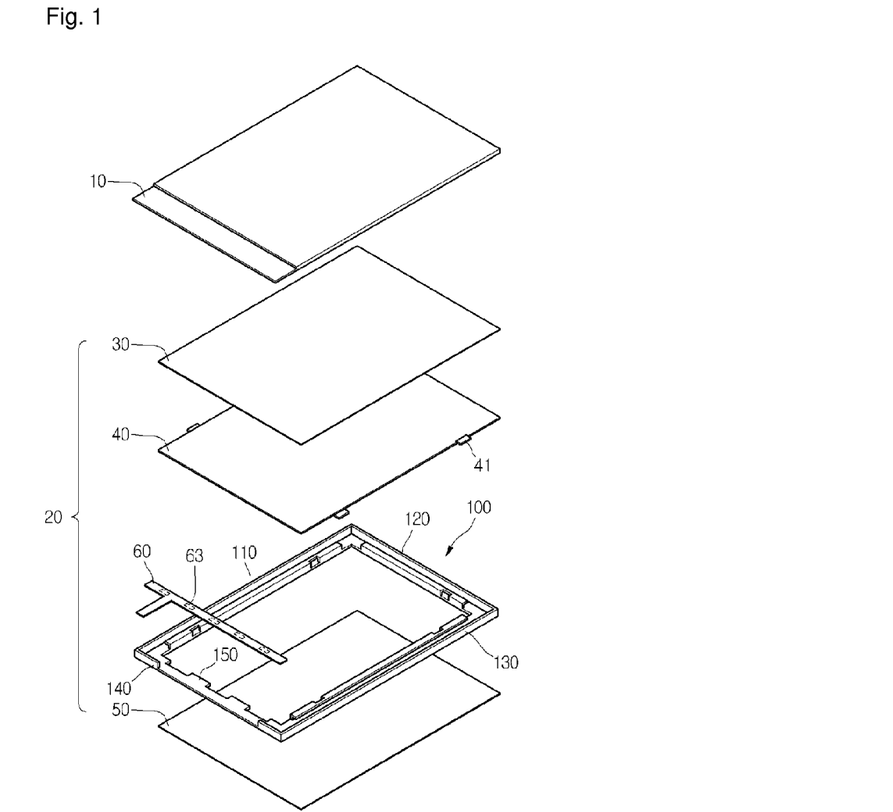
FIG. 1 is an exploded perspective view of a display device to which a receiving unit according to the first embodiment is applied.

FIG. 1 is an exploded perspective view of a display device to which a receiving unit according to the first embodiment is applied.

The display device includes a liquid crystal (LC) panel 10, a backlight assembly 20, and a receiving unit 100.

The LC panel 10 includes a thin film transistor (TFT) substrate, a color filter substrate, and an LC layer interposed therebetween.

The backlight assembly 20 includes a light emitting unit 60, a light guide plate 40, an optical sheet 30, and a reflection sheet 50.

The light emitting unit 60 includes a lamp such as a light emitting diode (LED) and a cold cathode fluorescent lamp (CCFL) to emit generated light to the light guide plate 40.

The light guide plate 40 receives light emitted from the light emitting unit 60 to uniformly diffuse the light on the entire light emitting region of the backlight assembly. At least one hooking protrusion 41 is formed on the lateral side of the light guide plate 40 to couple to the receiving unit 100.

The optical sheet 30 is attached on the light guide plate 40, and selectively includes a lens sheet, a diffusion sheet, and a protection sheet.

The reflection sheet 50 is attached under the light guide plate 40 to reflect light leaking to a rear direction from the light guide plate 40 back to the light emitting region.

The receiving unit 100 receives and fixes at least one of the LC panel 10 and the backlight assembly 20. More specifically, the receiving unit 100 can fix the backlight assembly 20 and support the LC panel 10.

Figure 2:
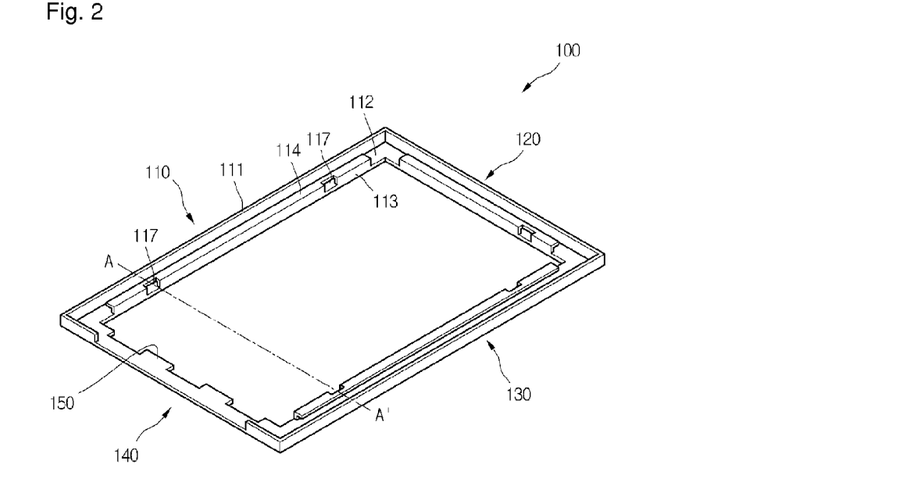
FIG. 2 is a perspective view of a receiving unit according to the first embodiment.
Figure 3:
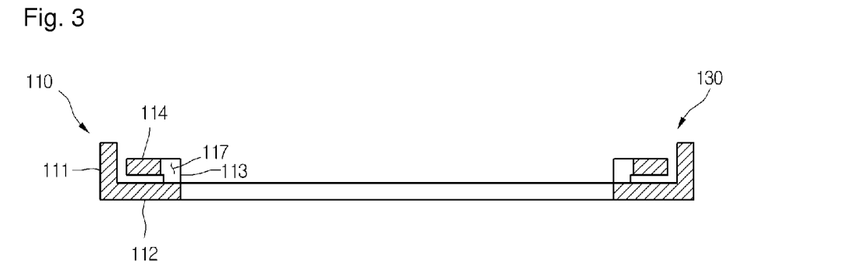
FIG. 3 is a cross-sectional view of FIG. 2, taken along a line A-A'.

FIG. 2 is a perspective view of a receiving unit according to the first embodiment, and FIG. 3 is a cross-sectional view of FIG. 2, taken along a line A-A'.

Referring to FIG. 2, the receiving unit 100 is formed in a shape corresponding to the appearance of the LC panel 10 or the backlight assembly 20 to receive the LC panel 10 or the backlight assembly 20.

The receiving unit 100 can be formed in a frame shape, for example. The receiving unit 100 includes a first frame 110, a second frame 120, a third frame 130, and a fourth frame 140.

The first frame 110 and the third frame 130 are disposed to face each other, and the second frame 120 and the fourth frame 140 are disposed to face each other. The first to fourth frames 110, 120, 130, and 140 are connected in a closed loop shape. Therefore, the first to fourth frames 110, 120, 130, and 140 have a quadrangular frame shape when viewed from a plane.

The receiving unit 100 can be formed of metal. For example, the receiving unit 100 can be formed of at least one of stainless steel, iron, aluminum, an aluminum alloy, and copper. Besides, the receiving unit 100 can include various metals.

A lamp receiving portion 150 can be formed inside the fourth frame 140 so that lamps 63 of the light emitting unit 60 can be received therein.

Referring to FIGS. 2 and 3, the first to fourth frames 110, 120, 130, and 140 of the receiving unit 100 includes a sidewall 111 and a first support 112 extending from the lower edge of the sidewall 111 and bent to form a right angle to the sidewall 111.

The sidewall 111 can protect the outer side portion of the LC panel 10 or the backlight assembly 20. The first support 112 can support the lower portion of the LC panel 10 or the backlight assembly 20.

The sidewall 111 of the fourth frame 140 is formed on only the edge region to expose the lamp receiving portion 150. This is for preventing the light emitting unit 60 from protruding when it is received in the lamp receiving portion 150.

The first to third frame 110, 120, and 130 include the sidewall 111, the first support 112, a second support 113, and a third support 114.

The second support 113 is bent or curved to extend from the edge of the first support 112, and forms a right angle to the first support 112.

The third support 114 extends from the edge of the second support 113, and bent or curved to form a right angle to the second support 113.

The sidewall 111 and the second support 113 are disposed to have a parallel structure. That is, the sidewall 111 and the second support 113 face each other.

The first support 112 and the third support 114 are disposed to have a parallel structure. That is, the first support 112 and the third support 114 face each other.

Alternatively, the third support 114 can be bent or curved by 180° from the edge of the first support 112, and disposed to have a structure parallel to the first support 112. In other words, the third support 114 can be bent or curved by 180° from the first support 112 to face the first support 112.

A hooking groove 117 is disposed in a portion where the second support 113 and the third support 114 are connected to each other corresponding to a hooking protrusion 41 of the light guide plate 40.

Specifically, the hooking groove 117 by connection of a first groove formed in the edge of the second support 113 and a second groove formed in the edge of the third support 114.

For example, the connection portion of the second support 113 and the third support 114 is selectively removed to form the hooking groove 117 having a hole shape.

When the light guide plate 40 is coupled to the receiving unit 100, the hooking protrusion 41 of the light guide plate 40 is inserted into the hooking groove 117, so that coupling between the receiving unit 100 and the light guide plate 40 can be reinforced.

After the light guide plate 40 is received in the hooking groove 117 of the receiving unit 100, the optical sheet 30 and the LC panel 10 can be received on the light guide plate 40. At this point, the optical sheet 30 and the LC panel 10 can be disposed on the third support 114.

The side portions of the LC panel 10 and the backlight assembly 20 are protected by the sidewall 111 and the second support 113. The lower portions of the LC panel 10 and the backlight assembly 20 are supported by the first support 112 and the third support 114.

Therefore, since the receiving unit 100 is disposed in a double structure on the outer side of the LC panel 10 and the backlight assembly 20, the strength of the display device can be reinforced.

Since the receiving unit 100 can be formed of metal, it can protect the LC panel 10 and the backlight assembly 20 from an external impact through the strength in itself.

Also, since the LC panel 10 and the backlight assembly 20 are directly coupled to the receiving unit 100 itself formed of metal, mold frame forming and a coupling operation according to a related art are omitted, so that time and costs can be reduced.

Also, since the receiving unit 100 can be formed in a thin metal, the display device can be miniaturized and made in a slim profile.

Figure 4:
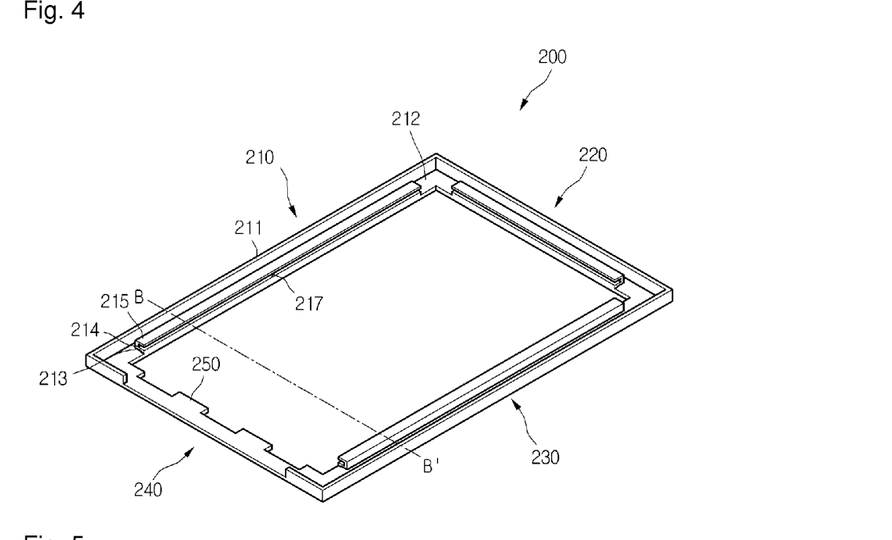
FIG. 4 is a perspective view illustrating the shape of a receiving unit according to the second embodiment.
Figure 5:
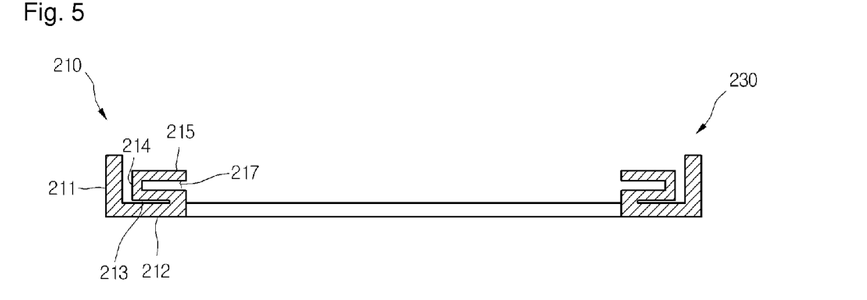
FIG. 5 is a cross-sectional view of FIG. 4, taken along a line B-B'.

FIG. 4 is a perspective view illustrating the shape of a receiving unit according to the second embodiment, and FIG. 5 is a cross-sectional view of FIG. 4, taken along a line B-B'.

Referring to FIGS. 4 and 5, the receiving unit 200 includes first to fourth frames 210, 220, 230, and 240.

The first to fourth frames 210, 220, 230, and 240 of the receiving unit 200 include a sidewall 211 and a first support 212.

Since the structures and the shapes of the sidewall 211 and the first support 212 are the same as those in the previous embodiment, descriptions thereof are omitted.

Also, the first to third frames 210, 220, and 230 include a second support 213, a third support 214, and a fourth support 215.

The second support 213 is bent or curved by 180° to extend from the edge of the first support 212 to have a structure parallel to the first support 212.

The third support 214 is bent or curved upward from the edge of the second support 213 to form a right angle to the second support 213.

The fourth support 215 is bent or curved from the edge of the third support 214 to form a right angle to the third support 214. Alternatively, the fourth support 215 can be bent or curved by 180° from the second support 213.

The second support 213, the third support 214, and the fourth support 215 can be a light guide plate receiving unit. The light guide plate receiving unit is disposed on the first support 212.

The sidewall 211 and the third support 214 are separated from each other by a predetermined distance. The sidewall 211 and the third support 214 are disposed to be parallel to each other. Also, the first support 212, the second support 213, and the fourth support 215 are disposed such that they are parallel to each other.

That is, the first support 212 and the second support 213 face each other. The second support 213 and the fourth support 215 face each other.

A concave groove is formed between the second support 213 and the fourth support 215 by the third support 214 connecting the second support 213 with the fourth support 215.

The concave grooves formed by the second support 213, the third support 214, and the fourth support 215 is called a receiving groove 217.

At least a portion of the light guide plate 40 is inserted into the receiving groove 217, so that the light guide plate 40 is received inside the receiving unit 200.

That is, at least a portion of the backlight assembly 20 is inserted in the receiving groove 217, and supported by the second support 213, the third support 214, and the fourth support 215.

For example, when the light guide plate 40 is received inside the receiving unit 200, a hooking protrusion 41 of the light guide plate 40 is inserted into the receiving groove 217, so that coupling between the receiving unit 200 and the light guide plate 40 can be reinforced.

After the light guide plate 40 is inserted into the receiving groove 217 of the receiving unit 200, the optical sheet 30 and the LC panel 10 can be received on the light guide plate 40. At this point, the optical sheet 30 and the LC panel 10 are disposed on the fourth support 215.

That is, the optical sheet 30 and the LC panel 10 are supported by the fourth support 215.

The side portions of the LC panel 10 and the backlight assembly 20 are protected by the sidewall 211 and the third support 214. The lower portions of the LC panel 10 and the backlight assembly 20 are protected by the first support 212, the second support 213, and the fourth support 215.

Therefore, since the receiving unit 200 is disposed in a double structure or a triple structure on the outer side of the LC panel 10 and the backlight assembly 20, the strength of the display device can be reinforced.

Figure 6:
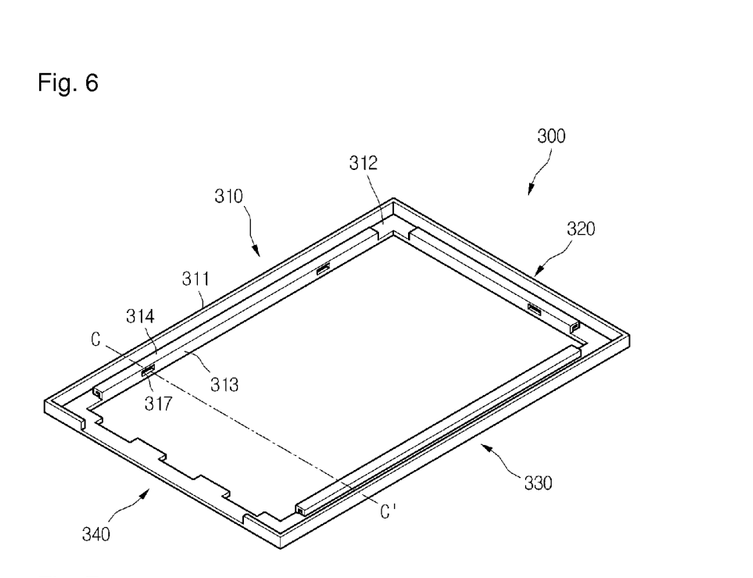
FIG. 6 is a perspective view illustrating the shape of a receiving unit according to the third embodiment.
Figure 7:
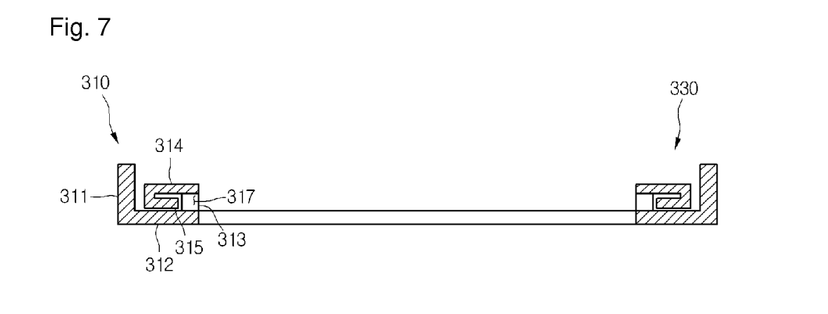
FIG. 7 is a cross-sectional view of FIG. 6, taken along a line C-C'.

FIG. 6 is a perspective view illustrating the shape of a receiving unit according to the third embodiment, and FIG. 7 is a cross-sectional view of FIG. 6, taken along a line C-C'.

Referring to FIGS. 6 and 7, a receiving unit 300 includes first to fourth frames 310, 320, 330, and 340.

The first to fourth frames 310, 320, 330, and 340 of the receiving unit 300 includes a sidewall 311 and a first support 312.

Since the structures and the shapes of the sidewall 311 and the first support 312 formed on the first to fourth frames 310, 320, 330, and 340 of the receiving unit 300 are the same as those in the first embodiment of FIG. 2, descriptions thereof are omitted.

Also, the first to third frames 310, 320, and 330 include a second support 313, a third support 314, and a fourth support 315.

The second support 313 is bent or curved upward from the edge of the first support 312 and extend to form a right angle to the first support 312.

The third support 314 is bent or curved from the edge of the second support 313 and extend to form a right angle to the second support 313 while facing the sidewall 311.

The fourth support 315 extends from the edge of the third support 314, and the end of the fourth support 315 is bent or curved by 180° form the edge of the third support 314 to face the second support 313. The fourth support 315 is disposed between the first support 312 and the third support 314.

The sidewall 311 and the second support 313 are disposed such that they are parallel to each other and face each other.

Also, the first support 312, the third support 314, and the fourth support 315 are disposed such that they are parallel to each other. That is, the first support 312 and the fourth support 315 face each other. The third support 314 and the fourth support 315 face each other.

A hooking groove 317 is disposed in a portion of the second support 313 corresponding to a hooking protrusion 41 of a light guide plate 40.

That is, the second support 313 vertically extending from the first support 312 is selectively removed, so that the hooking groove 317 having a hole shape is formed.

When the light guide plate 40 is coupled to the receiving unit 300, the hooking protrusion 41 of the light guide plate 40 is inserted into the hooking groove 317, so that coupling between the receiving unit 300 and the light guide plate 40 can be reinforced.

After the hooking protrusion 41 of the light guide plate 40 is received in the hooking groove 317 of the receiving unit 300, the optical sheet 30 and the LC panel 10 can be received on the light guide plate 40. At this point, the optical sheet 30 and the LC panel 10 are disposed on the third support 314.

The side portions of the LC panel 10 and the backlight assembly 20 are protected by the sidewalls 311 and the second supports 313 of the first to fourth frames 310, 320, 330, and 340 of the receiving unit 300. The lower portions of the LC panel 10 and the backlight assembly 20 are supported by the first support 312, the third support 314, and the fourth support 315.

Therefore, since the receiving unit 300 is disposed in a double structure or a triple structure on the LC panel 10 and the backlight assembly 20, the strength of the display device can be reinforced.

Though the previous embodiments have described that the first to fourth supports are bent or curved by a right angle or 180° the first to fourth supports are not limited thereto. The first to fourth supports can be bent or curved by 80-100° or 150-180°.

Figure 8:
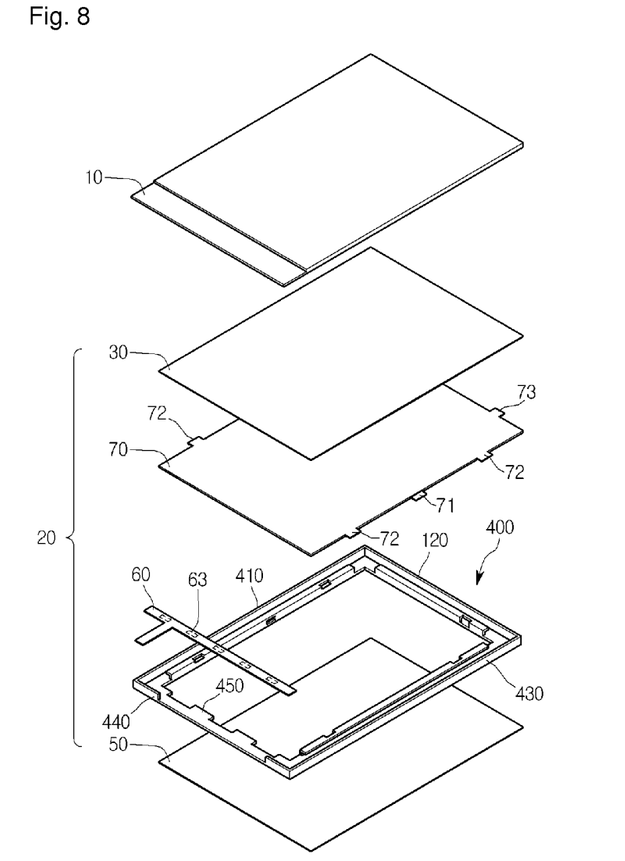
FIG. 8 is an exploded perspective view of a display device according to the fourth embodiment.

FIG. 8 is an exploded perspective view of a display device according to the fourth embodiment.

Referring to FIG. 8, the display device includes an LC panel 10, a backlight assembly 20, and a receiving unit 400.

The LC panel 10 includes a thin film transistor (TFT) substrate, a color filter substrate, and an LC layer interposed therebetween.

The backlight assembly 20 includes a light emitting unit 60, a light guide plate 70, an optical sheet 30, and a reflection sheet 50.

The light emitting unit 60 includes a lamp such as an LED and a CCFL 60 to emit generated light to the light guide plate 70.

The light guide plate 70 receives light emitted from the light emitting unit 60 to uniformly diffuse the light on the entire light emitting region of the backlight assembly. One or more hooking protrusions are formed on both sides of the light guide plate 70 to couple to the receiving unit 400.

For example, the protrusions formed on the light guide plate 70 can be disposed in zigzags on the lateral sides of the light guide plate 70. That is, a first coupling protrusion 71 located on one side of the lateral side of the light guide plate 70, and a second coupling protrusion 72 located on the other side of the lateral side of the light guide plate 70 can be disposed in zigzags. Therefore, the first coupling protrusion 71 and the second coupling protrusion 72 can be alternately disposed.

Also, a third coupling protrusion 73 can be formed on the upper side of the light guide plate 70.

Though not shown, the protrusions on both sides of the light guide plate 70 can be arranged such that they are aligned in a line on the lateral side of the light guide plate 70.

The optical sheet 30 is attached on the light guide plate 70, and selectively includes a lens sheet, a diffusion sheet, and a protection sheet.

The reflection sheet 50 is attached under the light guide plate 70 to reflect light leaking to a rear direction from the light guide plate 40 back to the light emitting region.

The LC panel 10 or the backlight assembly 20 should be received or fixed. For this purpose, the receiving unit 400 is used.

Figure 9:
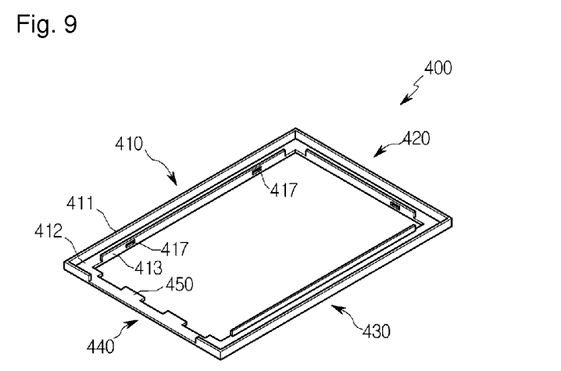
FIG. 9 is a perspective view of a receiving unit according to the fourth embodiment.
Figure 10:
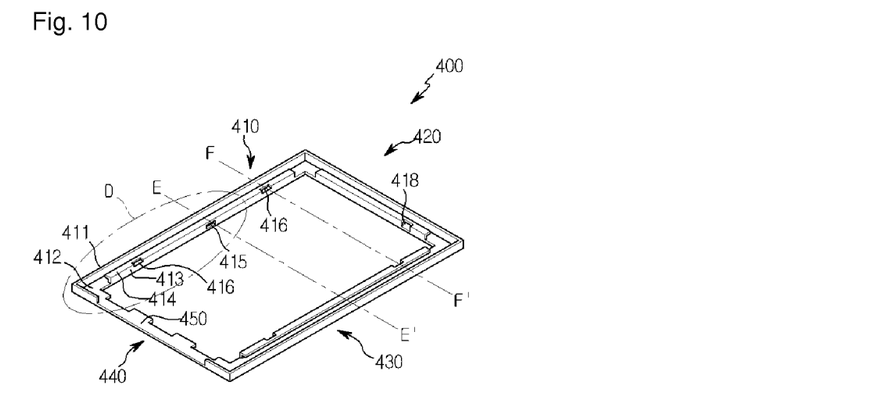
FIG. 10 is a perspective view illustrating another shape of a receiving unit according to the fourth embodiment.
Figure 11:
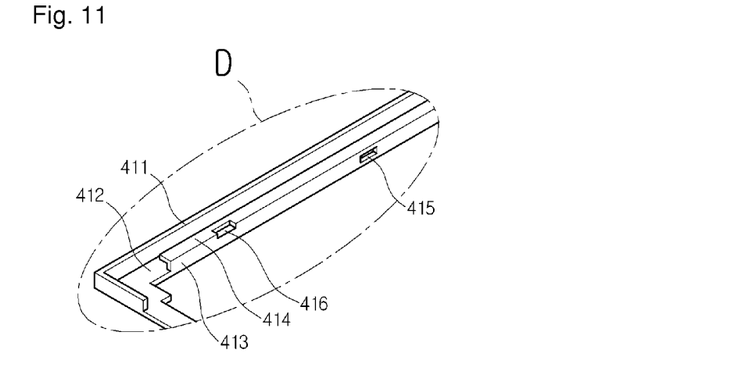
FIG. 11 is an enlarged view of a region D of FIG. 10.
Figure 12:
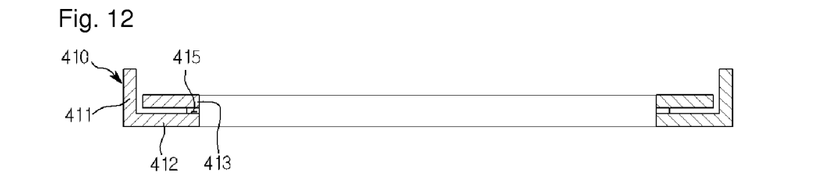
FIG. 12 is a cross-sectional view of FIG. 10, taken along a line E-E'.
Figure 13:
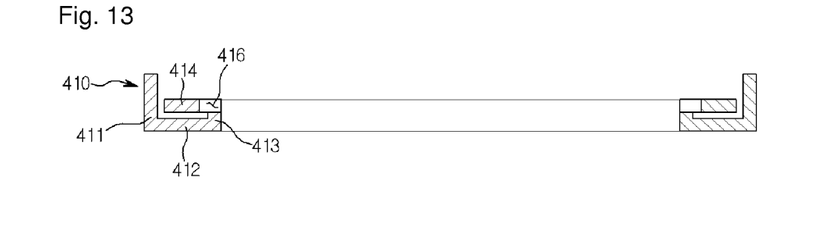
FIG. 13 is a cross-sectional view of FIG. 10, taken along a line F-F'.

FIG. 9 is a perspective view of a receiving unit according to the fourth embodiment, FIG. 10 is a perspective view illustrating another shape of a receiving unit according to the fourth embodiment, FIG. 11 is an enlarged view of a region D of FIG. 10, FIG. 12 is a cross-sectional view of FIG. 10, taken along a line E-E', and FIG. 13 is a cross-sectional view of FIG. 10, taken along a line F-F'.

Referring to FIG. 9, the receiving unit 400 can be formed in a shape corresponding to the appearance of the LC panel 10 or the backlight assembly 20.

The receiving unit 400 can be formed of metal. For example, the receiving unit 400 can be formed of at least one of stainless steel, iron, aluminum, an aluminum alloy, and copper. Besides, the receiving unit 400 can include various metals.

The receiving unit 400 includes a first frame 410, a second frame 420, a third frame 430, and a fourth frame 440.

The first frame 410 and the third frame 430 are disposed to face each other, and the second frame 420 and the fourth frame 440 are disposed to face each other. The first to fourth frames 410, 420, 430, and 440 are connected in a closed loop shape. Therefore, the first to fourth frames 410, 420, 430, and 440 have a quadrangular frame shape when viewed from a plane.

The first to fourth frames 410, 420, 430, and 440 of includes a sidewall 411 and a first support 412 vertically bent or curved from the lower edge of the sidewall 411.

The sidewall 411 is for protecting the outer side portion of a display device mounted in the receiving unit 400. The first support 412 is for protecting the lower portion of the display device.

A lamp receiving portion 450 can be formed inside the first support 412 of the fourth frame 440 to receive the lamps 63 of the light emitting unit 60.

The sidewall 411 of the fourth frame 440 is formed on only the edge region to expose the lamp receiving portion 450. This is for preventing the light emitting unit 60 from protruding when it is received in the lamp receiving portion 450.

The first to third frame 410, 420, and 430 include a sidewall 411, the first support 412, and a second support 413.

The second support 413 extends from the edge of the first support 412, and is bent or curved to form a right angle to the first support 412.

Coupling grooves 417 corresponding to coupling protrusions of the light guide plate 70 can be formed in the second support 413. For example, the coupling protrusions of the light guide plate 70 can be formed in a line with respect to the lateral side of the light guide plate 70 and inserted into the coupling grooves 417 of the second support 413.

Referring to FIGS. 10 to 13, the first to third frames 410, 420, and 430 include a third support 414.

The third support 414 extends form the edge of the second support 413 and is bent or curved to form a right angle to the second support 413.

The receiving unit of FIG. 10 is identical to the receiving unit of FIG. 9 having The third support extending from the second support, and FIG. 11 is an enlarged view of a region D of FIG. 10.

The sidewall 411 and the second support 413 are disposed in a mutually parallel structure.

The first support 412 and the third support 414 are disposed in a mutually parallel structure.

At least one first coupling groove 415 can be formed in the second support 413 to receive a first coupling protrusion 71 of the light guide plate 70.

At least one second coupling groove 416 can be formed in portions of the first and third frames 410 and 430 where the second support 413 and the third support 414 are connected to each other to receive a second coupling protrusion 72 of the light guide plate 70.

That is, the second coupling groove 416 is formed by connection of a first groove formed in the second support 413 and a second groove formed in the third support 414.

A third coupling groove 418 can be formed in a portion where the second support 413 and the third support 414 of the second frame are connected to each other to receive a third coupling protrusion 73 of the light guide plate 70. The third coupling protrusion 73 not only fixes the light guide plate 70 but also serves as a guide for preventing the light guide plate 70 from being reversely coupled when it is coupled.

The first and second coupling grooves 415 and 416 can be disposed in zigzags to correspond to the locations of the first and second coupling protrusions 71 and 72 of the light guide plate 70. That is, the first and second coupling grooves 415 and 416 can be alternately disposed.

When the light guide plate 70 is coupled to the receiving unit 400, the first coupling protrusion 71 of the light guide plate 70 is inserted into the first coupling groove 415.

Also, the second coupling protrusion 72 of the light guide plate 70 is inserted into the second coupling groove 416.

Also, the third coupling protrusion 73 of the light guide plate 70 is inserted into the third coupling groove 418 formed in a portion of the second frame 420 where the second support 413 and the third support 414 are connected to each other.

Since the first to third coupling protrusions 71, 72, and 73 of the light guide plate 70 are inserted into and fixed in the first to third coupling grooves 415, 416, and 418 of the receiving unit 400, coupling force between the light guide plate 70 and the receiving unit 400 can be reinforced.

Particularly, the first coupling protrusion 71 of the light guide plate 70 is not detached from the receiving unit 400 because it is coupled to the first coupling groove 415, coupling between the receiving unit 400 and the light guide plate 70 can be reinforced.

Also, since the second coupling protrusion 72 of the light guide plate 70 is disposed inside the second coupling groove 416 to fix the light guide plate 70, coupling force between the receiving unit 400 and the light guide plate 70 can be reinforced.

Of course, even when a space is formed by a height difference between the first coupling protrusion 71 and the second coupling protrusion 72 and only the first coupling groove 415 is formed to receive the first coupling protrusion 71 instead of forming the second coupling groove 416 receiving the second coupling protrusion 72 in order to fix the light guide plate 70, the coupling force improves.

Also, the coupling protrusion-coupling groove pair such as the first coupling protrusion 71 and the first coupling groove 415, the second coupling protrusion 72 and the second coupling groove 416, and the third coupling protrusion 73 and the third coupling groove 418 can be selectively formed as a structure for solidly fixing the light guide plate 70. For example, the coupling protrusions and the coupling grooves formed left and right of the light guide plate 70 and the receiving unit 400 may not be formed symmetrically.

Also, since the first and second coupling protrusions 71 and 72 of the light guide plate 70 are inserted into the first and second coupling grooves 415 and 416 formed by selectively removing the second support 413 and the third support 414, the entire thickness of the display device is not influenced even when the light guide plate 70 is coupled to the receiving unit 400. Accordingly, a slim display device can be accomplished.

After the light guide plate 70 is inserted into the first and second coupling grooves 415 and 416 of the receiving unit 400, the optical sheet 30 and the LC panel 10 can be received on the light guide plate 70. At this point, the optical sheet 30 and the LC panel 10 are disposed on the third support 414.

That is, the lower portions of the LC panel 10 and the backlight assembly 20 can be supported by the first support 412 and the third support 414.

The side portions of the LC panel 10 and the backlight assembly 20 are protected by the sidewalls 411 of the first to fourth frames 410, 420, 430, and 440 of the receiving unit 400, and the second support 413. The lower portions of the LC panel 10 and the backlight assembly 20 are supported by the first support 412 and the third support 414.

Therefore, since the receiving unit 400 supports the side portions and the lower portions of the LC panel 10 and the backlight assembly 20 in a double structure, the strength of the display device can be reinforced.

Also, since the receiving unit 400 can be formed of metal, it can protect the LC panel 10 and the backlight assembly 20 from an external impact through the strength in itself.

Also, since the LC panel 10 and the backlight assembly 20 are directly coupled to the receiving unit 400 itself formed of metal, mold frame forming and a coupling operation according to a related art are omitted, so that time and costs can be reduced.

Also, since the receiving unit 400 can be formed in a thin metal, the display device can be miniaturized and made in a slim profile.

Figure 14:
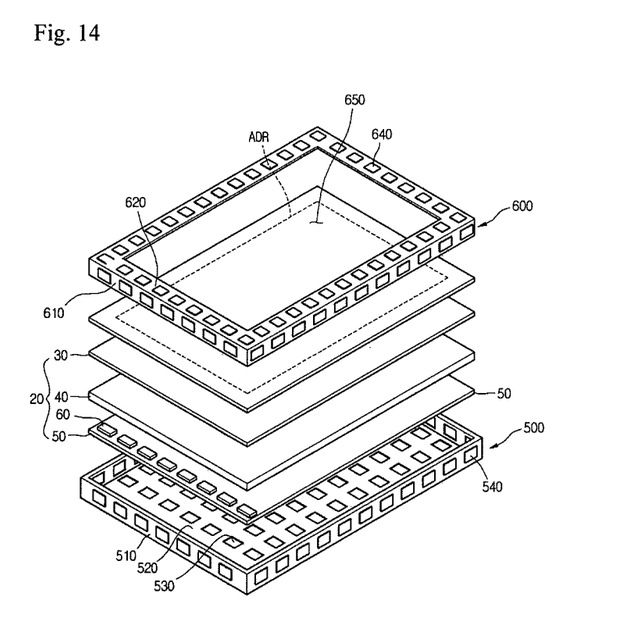
FIG. 14 is a perspective view of a display device according to the fifth embodiment.

FIG. 14 is a perspective view of a display device according to the fifth embodiment.

Referring to FIG. 14, the display device includes a first receiving unit 500, a backlight assembly 20, an LC panel 10, and a second receiving unit 600.

The backlight assembly 20 generates light and emits the light upward. The backlight assembly 20 can include a reflection sheet 50, a light guide plate 40, an optical sheet 30, and a lamp 63.

The reflection sheet 50 is disposed inside the first receiving unit 500 and reflects light generated from the lamp 63 upward.

The light guide plate 40 is disposed on the reflection sheet 50 to improve the brightness uniformity of light generated from the lamp 63. The light guide plate 40 is disposed inside the first receiving unit 500 and disposed on the reflection sheet 50.

The optical sheet 30 improves the characteristic of light emitted upward from the light guide plate 40. The optical sheet 30 can be a diffusion sheet, a polarization sheet, or a prism sheet.

The lamp 63 is disposed inside the first receiving unit 500 and disposed on the lateral side of the light guide plate 40. The lamp 63 generates light and can be electrically connected to a driving circuit driving the lamp 63.

The LC panel 10 is disposed on the above-described optical members 200. The LC panel 10 is disposed on the optical sheet 30. The intensity of light passing through the LC panel 10 is controlled and an image is displayed by an electrical signal generated from a circuit driving the LC panel 10.

The LC panel 10 includes an effective display region ADR displaying an image thereon and a non-effective display region around the effective display region.

The second receiving unit 600 is disposed on the LC panel 10. The second receiving unit 600 includes a through hole 650. The through hole 650 exposes a portion or the entire surface of the effective display region ADR.

The first receiving unit 500 receives the backlight assembly 20 and the LC panel 10.

Figure 15:
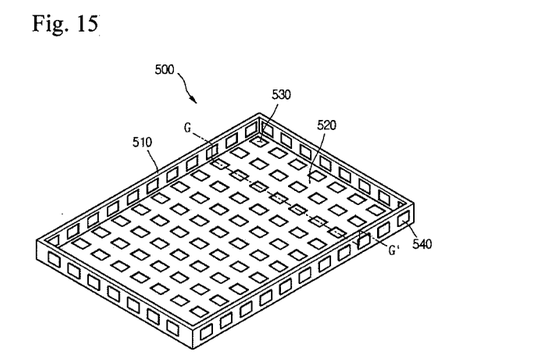
FIG. 15 is a perspective view of a first receiving unit.
Figure 16:
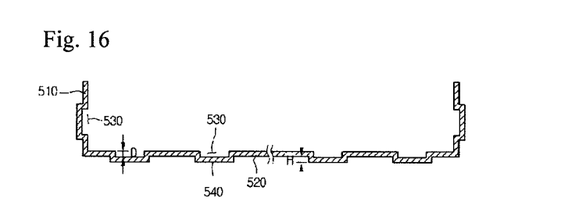
FIG. 16 is a cross-sectional view of FIG. 15, taken along a line G-G'.

FIG. 15 is a perspective view of a first receiving unit, and FIG. 16 is a cross-sectional view of FIG. 15, taken along a line G-G'.

Referring to FIGS. 15 and 16, the first receiving unit 500 includes first sidewalls 510 and a bottom support 520.

The first sidewalls 510 can be connected to each other in a closed loop shape. The first sidewalls 510 have a thickness of about 0.07-0.2 mm.

First groove patterns 530 are formed in the inner side surfaces of the first sidewalls 510. The first groove patterns 530 have a depth D of about 20-30 μm.

First protrusion patterns 540 are formed on the outer side surfaces of the first sidewalls 510 to correspond to the first groove patterns 530. The first protrusion patterns 540 have a height H of about 20-30 μm.

Alternatively, groove patterns can be formed in the outer side surfaces of the first sidewalls 510, and protrusion patterns can be formed on the outer side surfaces of the first sidewalls 510 to correspond to the groove patterns.

Alternatively, first groove patterns 530 can be formed in one of the inner side surfaces and the outer side surfaces of the first sidewalls 510, and the other surfaces can be flat.

The first groove patterns 530 and the first protrusion patterns 540 can be formed by plastic working.

The first groove patterns 530 and the first protrusion patterns 540 can be formed by a knurling process, for example.

The bottom support 520 is integrally formed with the first sidewalls 510 and extends from the inner lower surfaces of the first sidewalls 510.

The side surfaces of the bottom support 520 are connected to the first sidewalls 510 and thus integrally formed with the first sidewalls 510.

The first groove patterns 530 are formed in the upper surface of the bottom support 520. The plane shape of the first groove patterns 530 can be a rectangle. The first groove patterns 530 can be formed in a lattice shape.

First protrusions 540 are formed on the rear side of the bottom support 520 to correspond to the first groove patterns 530. The depth D of the first groove pattern 530 is about 20-30 μm, and the height H of the first protrusion pattern 540 is about 20-30 μm.

Alternatively, the protrusion patterns can be formed on the upper surface of the bottom support 520, and the groove patterns can be formed in the rear side of the bottom support 520.

Alternatively, the groove patterns can be formed in one of the upper surface and a rear side of the bottom support 520, and the other side can be flat.

Examples of a material that can be used for the receiving unit 500 includes metal and plastic. The sidewall 110 can be comprised of at least one of stainless steel, iron (Fe), aluminum (Al), an aluminum alloy, and copper (Cu).

The second receiving unit 600 covers the LC panel 10.

Figure 17:
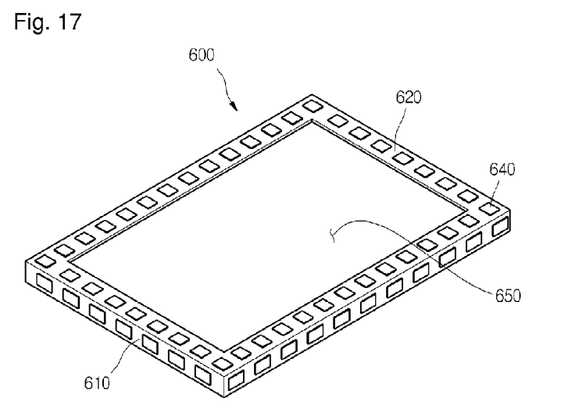
FIG. 17 is a perspective view of a second receiving unit.

FIG. 17 is a perspective view of a second receiving unit.

Referring to FIG. 17, the second receiving unit 600 includes second sidewalls 610 and a top support 620.

The top support 620 includes a through hole 650. The through hole 620 can have a rectangular shape when viewed from a top. The top support 620 is integrally formed. The top support 620 extends from the inner upper ends of the second sidewalls 610.

Second protrusion patterns 640 are formed on the upper side of the top support 620, and second groove patterns are formed in the rear side of the top support 620 to correspond to the second protrusion patterns 640.

Alternatively, the groove patterns can be formed in the upper surface of the top support 620, and the protrusion patterns can be formed on the rear side of the top support 620 to correspond to the groove patterns.

Alternatively, the groove patterns can be formed on one of the upper surface and the rear side of the top support 620, and the other side can be flat.

The first groove patterns 530 and the first protrusion patterns 540 are formed on the first receiving unit 500. The warping characteristic of the first receiving unit 500 is enhanced by the first groove patterns 530 and the first protrusion patterns 540.

The lateral sides of the bottom support 520 are fixed and force is vertically applied to the central portion of the bottom support 520. At this point, the bottom support 520 where the first groove patterns 530 and the first protrusion patterns 540 have been formed is less warped than a support where groove patterns and protrusion patterns have not been formed.

Also, the warping characteristic and the strength of the second receiving unit 600 are enhanced by the second groove patterns and the second protrusion patterns 640.

Therefore, the first receiving unit 500 and the second receiving unit 600 can protect the LC panel 10 and the backlight assembly 20 from an external physical impact.

Also, the first receiving unit 500 and the second receiving unit 600 can prevent the LC panel 10 and the backlight assembly 20 from being destroyed.

Also, the first receiving unit 500 can be formed such that the thickness of the bottom support 520 where the first groove patterns 530 and the first protrusion patterns 540 have been formed is less than that of a support where groove patterns and protrusion patterns have not been formed.

Likewise, the second receiving unit 600 can be formed in a thin thickness.

Figure 18:
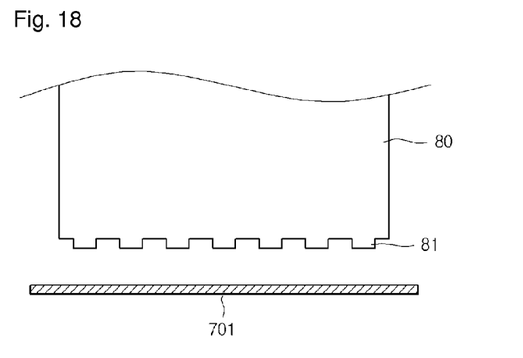
FIGS. 18 and 19 are cross-sectional views illustrating a process in a manufacturing method of a receiving unit according to the fifth embodiment.
Figure 19:
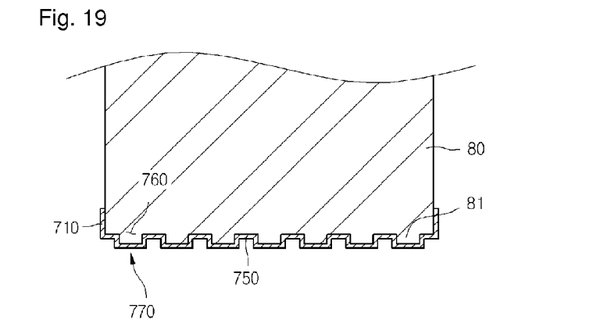

FIGS. 18 and 19 are cross-sectional views illustrating a process in a manufacturing method of a receiving unit according to the fifth embodiment.

Referring to FIG. 18, a metal plate 701 for manufacturing the receiving unit is provided. Examples of a material that can be used for the metal plate 701 include stainless steel, iron, aluminum, an aluminum alloy, and copper.

Referring to FIG. 19, the metal plate 701 is processed by a forming device, for example, a press device, which is a pressurizing forming device. The press device 80 includes formation protrusion patterns 81 formed in a surface contacting the metal plate 701.

The press device 80 pressurizes the central portion of the metal plate 701 to form sidewalls 710 and a support 750.

Groove patterns 760 corresponding to the formation protrusion patterns 81 are formed in the upper surface of the support 750. Also, protrusion patterns 770 corresponding to the groove patterns 760 are formed on the rear side of the support 750.

Figure 20:
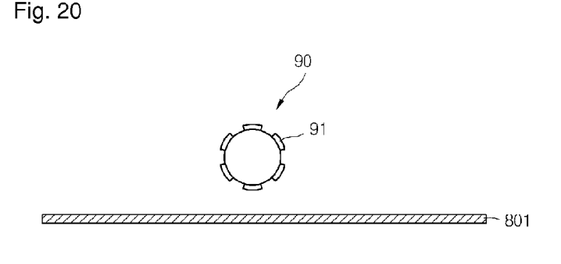
FIGS. 20 to 22 are side views or cross-sectional views illustrating a process in another example of a manufacturing method of a receiving unit according to still another embodiment.
Figure 21:
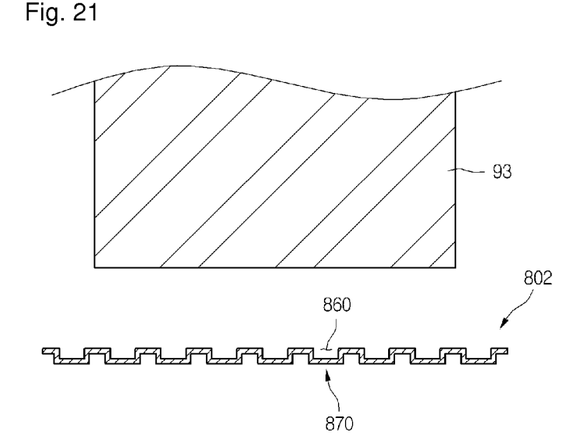
Figure 22:
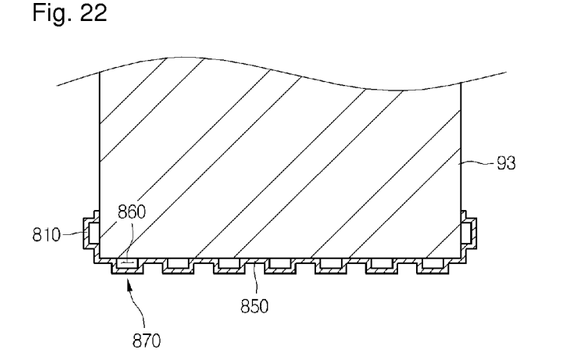

FIGS. 20 to 22 are side views or cross-sectional views illustrating a process in another example of a manufacturing method of a receiving unit according to the fifth embodiment.

Referring to FIG. 20, a metal plate 801 for manufacturing a receiving unit is provided. The metal plate 801 is pressed by a roller 90 on the surface of which formation protrusion patterns 91 have been formed. Groove patterns 860 corresponding to the formation protrusion patterns 91 are formed in one side of the metal plate 801, and protrusion patterns 870 corresponding to the groove patterns 860 are formed on the other side of the metal plate 801.

Referring to FIGS. 21 and 22, the press device 601 pressurizes the central portion of the metal plate 801 where the first groove patterns 530 have been formed to form sidewalls 810 and a support 850.

Figure 23:
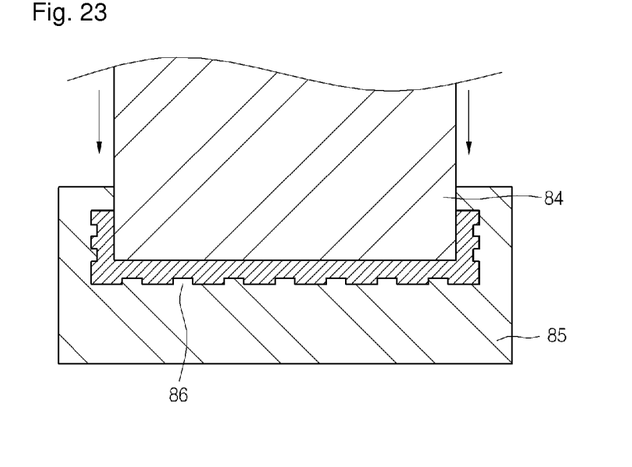
FIG. 23 is a cross-sectional view illustrating a process in still another example of a manufacturing method of a receiving unit according to the fifth embodiment.

FIG. 23 is a cross-sectional view illustrating a process in still another example of a manufacturing method of a receiving unit according to the fifth embodiment.

Referring to FIG. 23, metal for casting or plastic for casting is injected in a mold 85 in the inner surface of which protrusion patterns 86 have been formed, and pressure is applied by a press device 84. After that, a receiving unit is completed. The receiving unit includes groove patterns corresponding to the protrusion patterns 86.

The press device 84 can include protrusion patterns on its lower side. The groove patterns can be formed by the protrusion patterns formed in the lower side of the press device 84.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

Industrial Applicability

The display devices according to the embodiments can be used for displaying an image.

The invention claimed is:

1. A display device comprising:
a receiving unit comprising a sidewall, a first support bent or curved to extend from a lower edge of the sidewall, a second support bent or curved to extend from the first support, and facing the sidewall, and a third support bent or curved from an upper edge of the second support, and facing the first support; and
at least one of a liquid crystal panel and a backlight assembly being received in the receiving unit.

2. The display device according to claim 1, wherein the sidewall and the second support are disposed on an outer side of the backlight assembly, and the liquid crystal panel is disposed on the backlight assembly.

3. The display device according to claim 1, wherein the liquid crystal panel is disposed on the third support, and supported by the third support.

4. The display device according to claim 1, comprising a fourth support bent or curved to extend from the third support, the fourth support being disposed between the third support and the first support.

5. The display device according to claim 1, wherein a first groove is formed in a portion where the second support and the third support are connected to each other.

6. The display device according to claim 5, wherein the backlight assembly comprises a light guide plate comprising a protrusion corresponding to the first groove.

7. The display device according to claim 5, wherein a plurality of second grooves are formed in the second support, and a plurality of first grooves and the plurality of second grooves are arranged in zigzags.

8. The display device according to claim 1, wherein a groove is formed in the second support.

9. The display device according to claim 1, wherein the sidewall, the first support, and the second support are formed of metal.

10. The display device according to claim 1, wherein the receiving unit is formed in a frame shape.

11. A display device comprising:
    a liquid crystal panel;
    a backlight assembly under the liquid crystal panel;
    a sidewall on an outer side of the liquid crystal panel and the backlight assembly;
    a first support extending from an inner surface of the sidewall;
    a second support bent or curved to extend from the first support, and supporting at least one of the liquid crystal panel and the backlight assembly; and
    a third support bent or curved to extend from the second support,
    wherein the first support and the second support face each other, and
    wherein the sidewall, the first support, and the second support are formed of metal.

12. The display device according to claim 11, wherein the second support is bent or curved by 150-180°.

13. The display device according to claim 11, further comprising:
    a fourth support bent or curved to extend from the third support and facing the second support,
    wherein the third support and the side wall face each other.

14. The display device according to claim 11, wherein the second support supports the backlight assembly, and the third support supports the liquid crystal panel.

15. A display device comprising:
    a receiving unit comprising a sidewall and a support extending from an inner surface of the sidewall, a plurality of groove patterns being formed on both the inner surface of the sidewall and an upper surface of the support;
    a plurality of protrusion patterns being formed on both an outer surface of the sidewall and a lower surface of the support;
    at least one of a liquid crystal panel and a backlight assembly being received in the receiving unit,
    wherein the receiving unit is formed of metal, and
    wherein the plurality of protrusion patterns are formed to correspond to the plurality of groove patterns.

16. The display device according to claim 15, wherein the plurality of groove patterns have a depth of 20-30 μm.

17. The display device according to claim 15, wherein at least one of the sidewall and the support has a thickness of 0.07-0.2 mm.

18. The display device according to claim 15, wherein the receiving unit comprises:
    a first receiving unit located under the backlight assembly and comprising a bottom support supporting the backlight assembly; and
    a second receiving unit located on the liquid crystal panel and comprising a through hole through which an image displayed on the liquid crystal panel is viewed.

19. The display device according to claim 18, wherein the plurality of groove patterns and the plurality of protrusion patterns are formed in an embossed type on at least one of the sidewall, the bottom support, and the support of the first receiving unit and the second receiving unit.

* * * * *